United States Patent
Ueda

[11] Patent Number: 6,003,560
[45] Date of Patent: Dec. 21, 1999

[54] METHOD FOR NESTING MULTIPLE CONCENTRIC PIPES

[75] Inventor: Kouhei Ueda, Tokyo, Japan

[73] Assignee: Taisei Corporation, Tokyo, Japan

[21] Appl. No.: 08/870,374

[22] Filed: Jun. 6, 1997

[30] Foreign Application Priority Data

Aug. 9, 1996 [JP] Japan .................................. 8-227870

[51] Int. Cl.[6] .................................................. F16L 9/19
[52] U.S. Cl. ............................................ 138/113; 138/114
[58] Field of Search .............................. 138/97, 98, 111, 138/114, 113; 405/150, 154, 156, 184, 146

[56] References Cited

U.S. PATENT DOCUMENTS

| | | | |
|---|---|---|---|
| 4,253,792 | 3/1981 | Nishikawa | 138/109 |
| 4,310,281 | 1/1982 | Egashira | 138/104 |
| 4,662,606 | 5/1987 | Akesaka | 254/29 R |
| 4,796,673 | 1/1989 | Ueda | 138/97 |
| 4,815,695 | 3/1989 | Akesaka | 254/29 R |
| 4,830,538 | 5/1989 | Ueda | 138/97 |
| 4,830,539 | 5/1989 | Akesaka | 254/29 R |
| 5,887,627 | 3/1999 | Ueda | 138/97 |

FOREIGN PATENT DOCUMENTS

| | | |
|---|---|---|
| 63-235782 | 9/1988 | Japan . |
| 1-54594 B2 | 11/1989 | Japan . |
| 3-40270 B2 | 6/1991 | Japan . |
| 4-119279 | 4/1992 | Japan . |
| 2560198 B2 | 9/1996 | Japan . |
| 9-71921 | 3/1997 | Japan . |
| 3-30757 B2 | 5/1997 | Japan . |

*Primary Examiner*—James F. Hook
*Attorney, Agent, or Firm*—Bozicevic, Field & Francis; Karl Bozicevic; Bret Field

[57] ABSTRACT

The front end of the outer pipe 21 of the nested pipes 2 is sealed off, an auxiliary pipe 3 is joined so as to be detachable onto the tail end of the outer pipe 21, and a thrusting device 4 is mounted onto the auxiliary pipe 3. The nested pipes 2 are filled with a filler fluid 28, then as the thrusting device 4 generates pressure on the filler fluid 28, the nested pipes 2 are inserted into the existing pipe 1.

11 Claims, 3 Drawing Sheets

METHOD FOR NESTING MULTIPLE CONCENTRIC PIPES

This application claims priority to Japanese application no. 8-227870 filed Aug. 9, 1996.

FIELD OF THE INVENTION

This invention relates to the field of civil engineering. More particularly, the invention relates to a method for the nesting of multiple concentric pipes within an existing pipe.

BACKGROUND OF THE INVENTION

In the conventional method for nesting multiple concentric pipes of different diameters b (hereinafter nested pipes b) into an existing pipe a, the tail end f of the inner pipe d of the nested pipes b must protrude from the tail end e of the outer pipe c of said nested pipes b. The reason is that a new section of the inner pipe d is first welded at joint g onto the section of the inner pipe d already inserted, next a section of the outer pipe c is welded at joint g onto the outer pipe c, then the extended nested pipes are inserted into the existing pipe a, after which the welding and insertion is repeated until the nested pipes are fully inserted. For this, in order that sections of inner pipe d can be welded together, its tail end f must protrude from the tail e of the outer pipe c. However, in this case, the plug of the thrusting device, not shown in the diagram, cannot be mounted inside the tail end e of the outer tube c. Accordingly, the outer pipe c cannot be filled with a filler fluid h upon which a pressure can be imparted by a thrusting device to push the nested pipes b into the existing pipe a.

SUMMARY OF THE INVENTION

This invention facilitates the nesting of multiple concentric pipes within an existing pipe.

This invention is a novel method for nesting multiple concentric pipes inside an existing pipe wherein the front end of the outer pipe of the nested pipes is sealed off, an auxiliary pipe is joined so as to be detachable onto the tail end of said outer pipe, a thrusting device is mounted onto the auxiliary pipe, said nested pipes are filled with a filler fluid, a pressure is generated on said filler fluid by said thrusting device, and said nested pipes are pushed into the existing pipe.

Further, this invention is a novel method for nesting multiple concentric pipes as described above, in which the space between the existing pipe and the nested pipes is filled with a heavy liquid which imparts a buoyancy to the nested pipes.

In addition, this invention is a novel method for nesting multiple concentric pipes as described above, in which a barrier is set on the front end of the nested pipes, wherein said barrier can slide inside the existing pipe while tightly sealing the heavy liquid inside said existing pipe.

| Explanation of Symbols | |
| --- | --- |
| 1 | Existing pipe |
| 2 | Nested pipes |
| 21 | Outer pipe |
| 22 | Inner pipe |
| 25 | Heavy liquid |
| 28 | Filler fluid |
| 3 | Auxiliary pipe |
| 31 | Tie-ring |
| 32 | Packing |
| 4 | Thrusting device |
| 41 | Plug |
| 42 | Dolly |
| 43 | Jack |

DESCRIPTION OF THE PREFERRED EMBODIMENTS

A preferred embodiment of this invention will be explained in the following, with reference to the diagrams.

1. Concentric Nesting of Multiple Pipes within Existing Pipe

Figure 1:
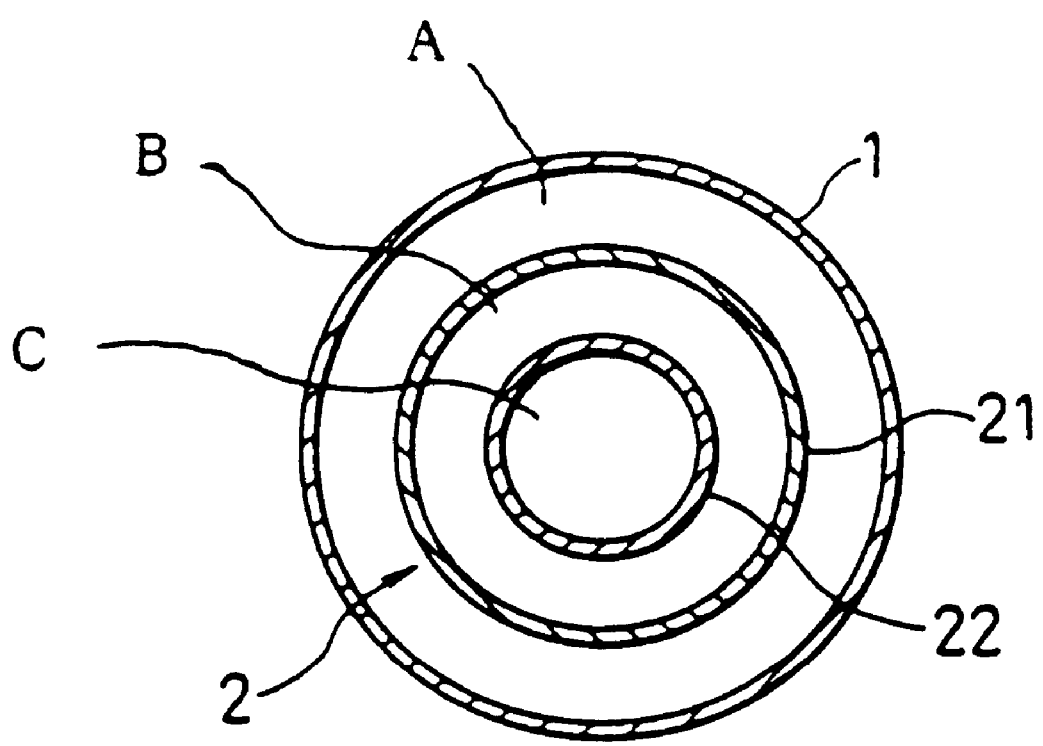
FIG. 1 is a cross-section diagram illustrating the nesting of multiple concentric pipes.

The objective is to insert new nested pipes of different thickness 2 into an existing pipe 1. Said nested pipes 2 are comprised of multiple concentric pipes and, for example, as shown in FIG. 1, can be two nested pipes comprised of an outer pipe 21 and an inner pipe 22. In this case, three zones A, B, and C, are formed between the existing pipe 1 and the nested pipes 2.

Said zones can be used as the conduits for various media, for example, many types of gases or oils could be transmitted. If the nested pipes 2 are comprised of two pipes, three different fluids can be transmitted, and if the nested pipes 2 are comprised of three pipes, four different fluids can be transmitted. In the example of FIG. 1, a high-viscosity oil or other fluid that must be heated could flow in Zone B, a heated fluid could flow in Zone C, and Zone A could be used as the return path for a heated fluid.

2. Overview of Insertion of Nested Pipes into Existing Pipe

Figure 2:
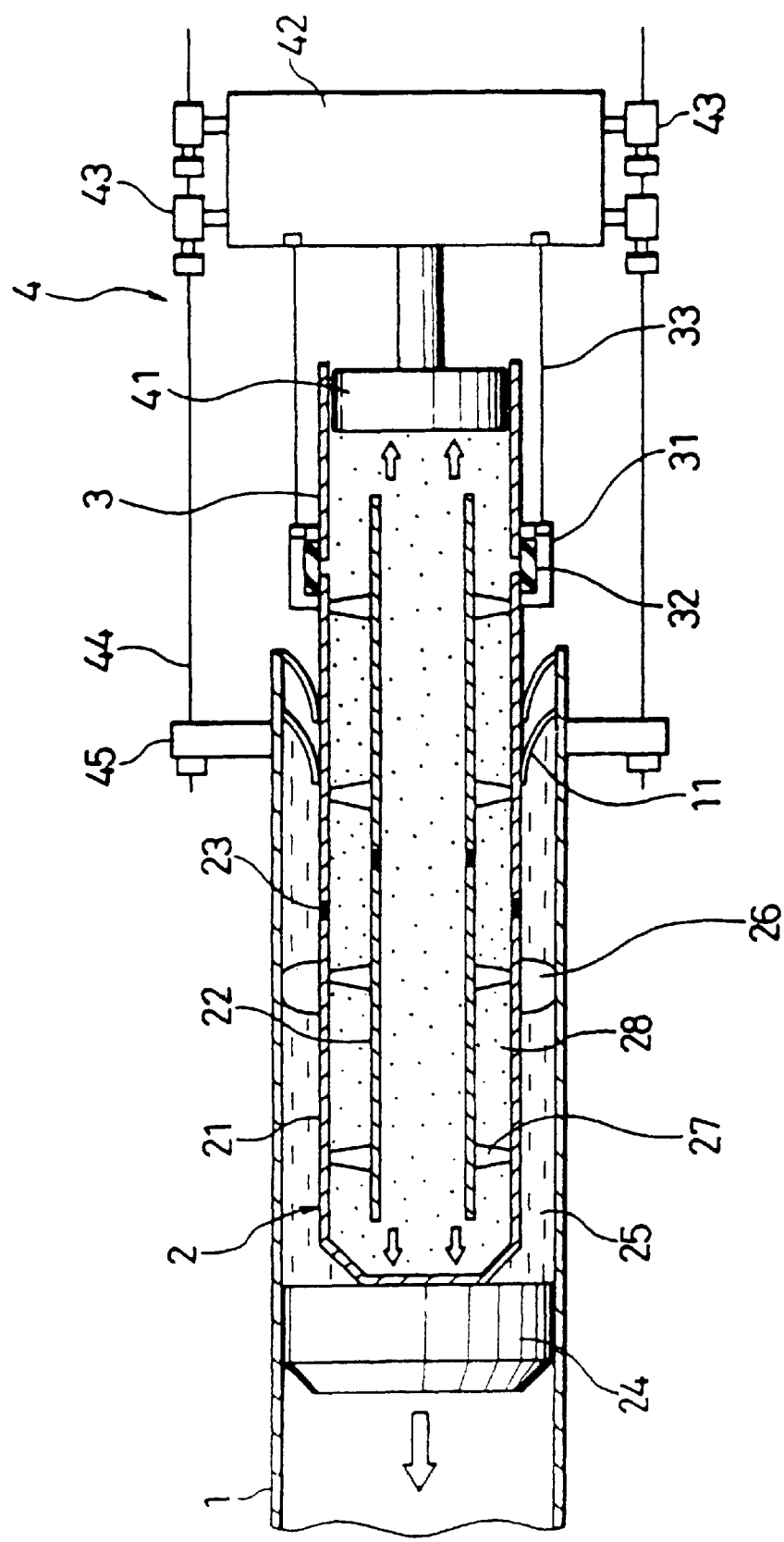
FIG. 2 illustrates the laying of nested pipes into an existing pipe in accordance with the method of this invention.
Figure 3:
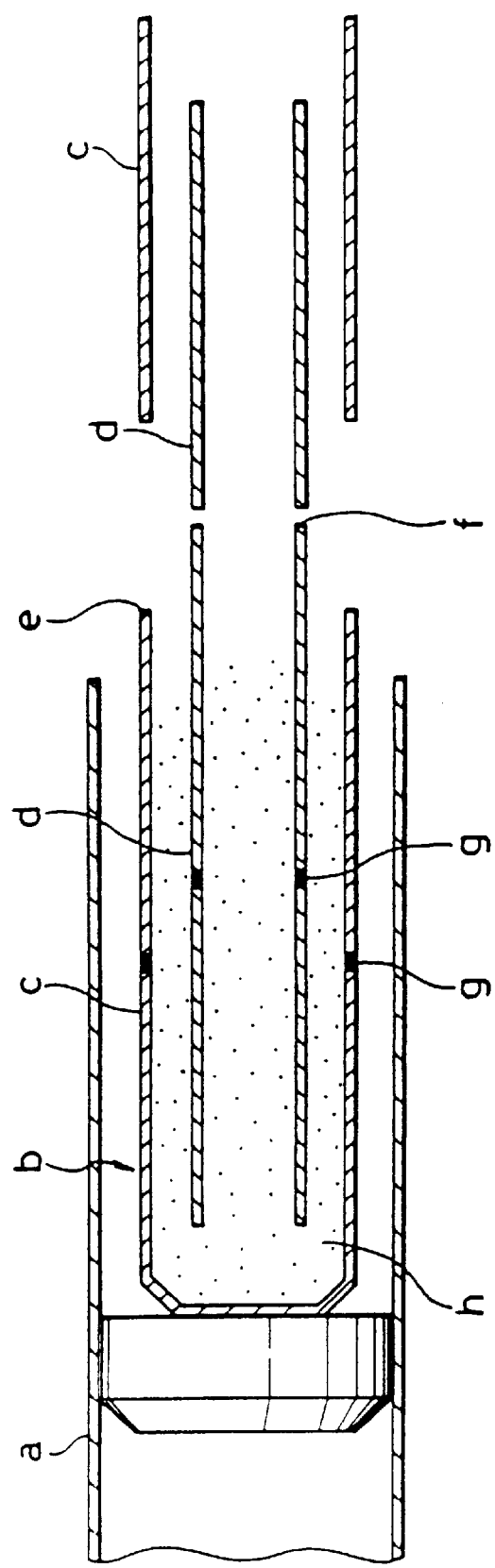
FIG. 3 illustrates the relative placement of the outer pipe and inner pipe comprising a double nested pipe.

As shown in FIG. 2, in the method of this invention to lay the nested pipes 2 into the existing pipe 1, the nested pipes 2 are filled with a filler fluid 28 which is sealed therein by a plug 41 stoppered tightly inside the tail end of said nested pipes 2. As said plug 41 of the thrusting device 4 is pushed inside said nested pipes 2, a pressure is imparted on said filler fluid 28 and said nested pipes 2 are inserted into the existing pipe 1. In this method, the pushing force of the plug 41 is transferred via the filler fluid 28 and applied uniformly to the front end of the nested pipes 2, thereby facilitating their insertion into the existing pipe 1.

3. Placement of Nested Pipes into Existing Pipe

The nested pipes 2 being inserted into the existing pipe 1 are comprised of multiple concentric pipes, for example, a double concentric pipe comprised of an outer pipe 21 and an inner pipe 22. A heavy liquid 25 filling the space between the nested pipes 2 and the existing pipe 1 will impart a buoyancy to the nested pipes 2 to facilitate their insertion.

A barrier 24 is set inside the existing pipe 1 in order to partition off the heavy liquid 25 within a prescribed section. Said barrier 24 is mounted on the front end of the nested pipes 2, and is set such that it can slide inside the existing pipe 1 while tightly sealing off the heavy liquid 25. It also functions as a centering device to position the nested pipes 2 in the center of the existing pipe 1. In addition, a disk 11 made of flexible rubber is mounted around the inner wall of the existing pipe 1 to seal the heavy liquid 25 inside said pipe.

Sliding spacers 26 are mounted around the circumference of the nested pipes 2. These spacers slide inside the existing pipe 1, and position the nested pipes 2 in the center of said existing pipe 1.

The nested pipes 2 are, for example, a double nested pipe comprised of an outer pipe 21 and an inner pipe 22. The front end of said outer pipe 21 is sealed off and the pipe is filled with filler fluid 28. Said inner pipe 22 is centered inside said outer pipe 21 by means of the nested pipe spacers 27. The filler fluid 28 can be filled by attaching an air tube on the perimeter of the inner pipe 22 or setting an air bag inside said inner pipe. An air hose is connected to the air tube or air bag, and is attached or removed as air is pumped in or discharged.

The initial sections of the outer pipe 21 and the inner pipe 22 are each inserted into the existing pipe 1, then each pipe is extended by welding on new sections with the formation of the welded joints 23. In order to weld a new section onto the inner pipe 22, said pipe must be exposed outside of the outer pipe 21, thus the tail end of said inner pipe 22 is left to protrude out of the tail end of the outer pipe 21.

4. Thrusting Device

A plug 41 must be stoppered inside the tail end of the outer pipe 21 in order to impart a pressure to the filler fluid 28 and push the nested pipes 2 forward. For this, an auxiliary pipe 3 is affixed so as to be detachable on to the tail end of the outer pipe 21. Said outer pipe 21 and auxiliary pipe 3 are connected by a tie-ring 31 which is tightly sealed with a packing 32 so that the filler fluid 28 cannot leak out.

The plug 41 of the thrusting device 4 is set inside the auxiliary pipe 3 to impart a pressure on the filler fluid 28. For this, the dolly 42 of said thrusting device 4 pulls on steel cable 44 by means of jack 43, and the reaction force so produced pushes the plug 41 on the end of the nested pipes 2, thereby imparting a pressure on the filler fluid 28. The dolly 42 and tie-ring 31 are connected by the coupling member 33 which limits the extent to which the nested pipes 2 are pushed. The steel cable 44 is mounted onto the existing pipe 1 by means of the fastener hardware 45.

Next, the procedures to use this invention are explained.

1. Placement of Nested Pipes into Existing Pipe

The front end of the outer pipe 21 is sealed off, then the barrier 24 is mounted. Sliding spacers 26 are also mounted around the circumference of said outer pipe. The inner pipe 22 is set inside the outer pipe 21 such that the tail end of the inner pipe protrudes outside of the outer pipe. Nested pipe spacers 27 are arranged between the outer pipe 21 and the inner pipe 22 to position the inner pipe 22 in the center of the outer pipe 21. The nested pipes 2 are then inserted into the existing pipe 1, and the space between the two said pipes is filled with a heavy liquid 25.

2. Mounting of Auxiliary Pipe

The auxiliary pipe 3 is mounted onto the tail end of the outer pipe 21 by means of the tie-ring 31, and the outer pipe 21 is filled with the filler fluid 28. With plug 41 set inside said auxiliary pipe 3, the jack 43 of the thrusting device 4 is operated to move said plug 41 into the outer pipe 21. In doing so, a pressure is applied to the filler fluid 28, the force of which advances the front end of the nested pipes 2 into the existing pipe 1.

3. Insertion of Nested Pipes

To extend the nested pipes 2, the auxiliary pipe 3 is removed from the tail end of the outer pipe 21. First a new section of inner pipe is welded onto the tail end of the inner pipe 22 to extend it. Next, a new section of the outer pipe is welded onto the tail end of the outer pipe 21 to extend it. The auxiliary pipe 3 is then affixed to the tail end of the welded outer pipe 21 by means of the tie-ring 31. Next, plug 41 is set in the auxiliary pipe 3, a pressure is generated on the filler fluid 28, and the nested pipes 2 are inserted into the existing pipe 1.

These operations are repeated to easily insert the whole length of the nested pipes into the existing pipe. The nested pipes 2 are not restricted to two pipes, and the invention can be applied to any arbitrary number of concentric pipes.

EFFECTIVENESS OF THIS INVENTION

This invention provides the following advantages:

1. The use of a detachable auxiliary pipe facilitates the nesting of multiple concentric pipes into an existing pipe;
2. The use of a filler fluid enables the nested pipes to be pushed into the existing pipe even as a pulling force is acting on them;
3. The space between the existing pipe and the nested pipes is filled with a heavy liquid to impart a buoyancy to the nested pipes which reduced the pushing force required to insert them.

What is claimed is:

1. A method for simultaneously nesting at least two concentric pipes inside an existing pipe, said method comprising:

a) providing a plug and a nested pipe assembly of at least two concentric pipes comprising an outer pipe having a front end and a tail end, an inner pipe having a front end and a tail end, and an auxiliary pipe, wherein said outer pipe front end is sealed, said inner pipe tail end extends beyond said outer pipe tail end, said auxiliary pipe is attached to said outer pipe tail end and extends said outer pipe beyond the tail end of said inner pipe, and said plug capable of sealing said existing pipe, said nested pipe assembly containing a liquid;

b) inserting said plug and said nested pipe assembly into said existing pipe;

c) applying pressure to said liquid; and d) pushing said nested pipe assembly into said existing pipe, thereby pushing said plug further into said existing pipe.

2. The method of claim 1, wherein step b) further comprises:

providing an annular seal between said existing pipe and said outer pipe, and filling the space between said existing pipe and said outer pipe with a heavy liquid.

3. The method of claim 1, which further comprises:

e) removing said auxiliary pipe from said outer pipe tail end;

f) extending said inner pipe by attaching a second inner pipe section to said inner pipe tail end;

g) extending said outer pipe by attaching a second outer pipe section to said outer pipe tail end;

h) attaching said auxiliary pipe to said second outer pipe section tail end to form an extended nested pipe assembly;

i) filling said extended nested pipe assembly with liquid;

j) applying pressure to said liquid; and k) advancing said extended nested pipe assembly into said existing pipe.

4. The method of claim 1 wherein said inner pipe, outer pipe and existing pipe are concentric.

5. The method of claim 1, wherein said nested pipe assembly comprises spacers between said inner pipe and said outer pipe.

6. The method of claim 1, wherein sliding spacers are provided between said existing pipe and said outer pipe.

7. The method of claim 1, wherein said outer pipe front end is attached to said plug.

8. The method of claim 1, wherein said nested pipe assembly comprises more than one inner pipe.

9. The method of claim 1, wherein said auxiliary pipe is attached to said outer pipe tail end by means of a tie-ring.

10. A nested pipe assembly for insertion into an existing pipe, said assembly comprising:

(a) an outer pipe having a front end and a tail end, said front end being sealed;

(b) a barrier of diameter larger than said outer pipe, fixed to said outer pipe front end, capable of sealing an existing pipe;

(c) an inner pipe having a front end and a tail end, said inner pipe tail end extending beyond said outer pipe tail end; and (d) a fluid filling said assembly.

11. The assembly of claim 10, further comprising:

a spacer between said inner pipe and said outer pipe.

* * * * *